United States Patent
Yau Fung Pun et al.

(10) Patent No.: US 9,955,296 B2
(45) Date of Patent: Apr. 24, 2018

(54) WIRELESS CONTROLLED THERMOSTAT WITH REDUCED POLLING COMMUNICATIONS DURING PREDICTED PERIODS OF LOW ACTIVITY TO SAVE POWER

(71) Applicant: EDWIN MCAULEY ELECTRONICS, LTD., North Point (CN)

(72) Inventors: Jerry Yau Fung Pun, North Point (CN); Anson Yeuk Lam Ho, North Point (CN); Vincent Wai Sing Law, North Point (CN)

(73) Assignee: EDWIN MCAULEY ELECTRONICS LTD., North Point (HK)

( * ) Notice: Subject to any disclaimer, the term of this patent is extended or adjusted under 35 U.S.C. 154(b) by 35 days.

(21) Appl. No.: 14/994,763

(22) Filed: Jan. 13, 2016

(65) Prior Publication Data
US 2017/0201953 A1    Jul. 13, 2017

(51) Int. Cl.
*G08C 17/00*     (2006.01)
*H04W 4/02*      (2018.01)

(52) U.S. Cl.
CPC .............. *H04W 4/021* (2013.01); *Y02D 70/00* (2018.01); *Y02D 70/142* (2018.01); *Y02D 70/144* (2018.01); *Y02D 70/162* (2018.01)

(58) Field of Classification Search
CPC ........................... H04W 52/267; H04W 4/021
See application file for complete search history.

(56) References Cited

U.S. PATENT DOCUMENTS

| | | |
|---|---|---|
| 4,819,714 A | 4/1989 | Otsuka et al. |
| D319,403 S | 8/1991 | Tiedemann |

(Continued)

OTHER PUBLICATIONS

Mathias, "A guide to Wi-Fi power-save technologies," Techworld, May 13, 2010, downloaded from web page: http://www.techworld.com/mobile/a-guide-to-wi-fi-power-save-technologies-4103/, Download date: Aug. 28, 2015, original posting date: unknown, 2 pages.

(Continued)

*Primary Examiner* — Afshawn M Towfighi
(74) *Attorney, Agent, or Firm* — Panitch Schwarze Belisario & Nadel LLP

(57) ABSTRACT

A temperature control apparatus for controlling operation of at least one temperature-modifying device includes a housing, a wireless communication module configured to communicate with a remote Internet-based server, and a controller in communication with the wireless communication module. The controller is configured to: (i) control operation of the temperature modifying device in response to a comparison of a measured ambient temperature with a setpoint temperature, (ii) in a user-selectable first mode of operation, during a first time period during a day, poll the remote server at a first rate of at least six times per hour, using the wireless communication module, for an instruction to change the setpoint temperature, and (iii) in the first mode of operation, during a second time period, poll the remote server at a second rate that is lower than the first rate, using the wireless communication module, for an instruction to change the setpoint temperature.

18 Claims, 5 Drawing Sheets

(56) References Cited

U.S. PATENT DOCUMENTS

| | | | |
|---|---|---|---|
| D403,972 S | 1/1999 | Gaskell et al. | |
| 6,192,258 B1 | 2/2001 | Kamada et al. | |
| 6,460,774 B2 | 10/2002 | Sumida et al. | |
| 6,595,430 B1 | 7/2003 | Shah | |
| 6,951,306 B2 | 10/2005 | DeLuca | |
| D734,180 S | 7/2015 | Benichou et al. | |
| 9,092,039 B2 | 7/2015 | Fadell et al. | |
| 9,483,064 B2* | 11/2016 | McPherson | G05D 23/1951 |
| 2007/0158442 A1 | 7/2007 | Chapman et al. | |
| 2009/0099697 A1 | 4/2009 | Li et al. | |
| 2010/0070089 A1 | 3/2010 | Harrod et al. | |
| 2010/0193592 A1 | 8/2010 | Simon et al. | |
| 2012/0131504 A1 | 5/2012 | Fadell et al. | |
| 2013/0099009 A1 | 4/2013 | Filson et al. | |
| 2013/0198266 A1* | 8/2013 | Kiley | H04L 67/34 709/203 |
| 2014/0319232 A1 | 10/2014 | Gourlay et al. | |
| 2014/0358295 A1 | 12/2014 | Warren et al. | |
| 2015/0276239 A1 | 10/2015 | Fadell et al. | |
| 2015/0300892 A1 | 10/2015 | Malhotra et al. | |
| 2016/0261425 A1* | 9/2016 | Horton | G05B 15/02 |
| 2017/0082313 A1 | 3/2017 | Benichou et al. | |

OTHER PUBLICATIONS

Office Action dated Jun. 29, 2017 in U.S. Appl. No. 14/857,040, by Benichou.

* cited by examiner

WIRELESS CONTROLLED THERMOSTAT WITH REDUCED POLLING COMMUNICATIONS DURING PREDICTED PERIODS OF LOW ACTIVITY TO SAVE POWER

BACKGROUND OF THE INVENTION

An embodiment of the present invention relates generally to a temperature control device, and more particularly, to a wirelessly communicating temperature control device that reduces polling communications during predicted periods of low activity in order to save power.

Digital programmable thermostats are common devices used to control the operation of heating and/or air conditioning systems in home or office buildings and other spaces requiring the regulation of air temperature. Often, such thermostats can be operated via a hard-wired connection to mains power or some other permanent power supply, but can additionally be equipped to operate on battery power. In addition, thermostats are increasingly taking advantage of wireless communication channels, such as WI-FI, BLUETOOTH or the like, to allow for remote setting of temperatures and other like operations.

Wireless communication modules require a fair amount of power for operation, and represent a significant drain on battery resources. In portable electronics, wireless protocols have been introduced to try and implement power saving use of the wireless communication circuitry. In some protocols, the radio may be switched off after a period of inactivity, and thereafter is periodically switched on to check for queued messages. The "off" time of the radio is often on the order of milliseconds, as many users find minute-long delays in receiving messages or data to be unacceptable.

Another issue with these types of protocols is that they remain in use indefinitely until the user decides to switch to a different operating mode. The various power-saving protocols therefore do not automatically accommodate for periods of the day when the user is more or less likely to require use of the wireless communication circuitry.

It is therefore desirable to provide a thermostat capable of wireless communication, but which also saves power and accounts for expected periods of activity of the user for changing the thermostat settings.

BRIEF SUMMARY OF THE INVENTION

Briefly stated, an embodiment of the present invention comprises a temperature control apparatus for controlling operation of at least one temperature-modifying device. The apparatus includes a housing, a wireless communication module contained within the housing and configured to communicate with a remote Internet-based server, and a controller contained within the housing and in communication with the wireless communication module. The controller is configured to: (i) control operation of the at least one temperature modifying device in response to a comparison of a measured ambient temperature with a setpoint temperature, (ii) in a user-selectable first mode of operation, during a first time period during a day, poll the remote server at a first rate of at least six times per hour, using the wireless communication module, for an instruction to change the setpoint temperature, and (iii) in the first mode of operation, during a second time period during the day different from the first time period, poll the remote server at a second rate that is lower than the first rate, using the wireless communication module, for an instruction to change the setpoint temperature.

Another embodiment of the present invention comprises a method for remotely modifying a setpoint temperature in a temperature control apparatus that controls operation of at least one temperature-modifying device. The method includes providing a mobile application configured to be stored and executed on a mobile device by a user of the temperature control apparatus, receiving, at an Internet-based remote server, an instruction from the mobile application to change the setpoint temperature in the temperature control apparatus, and polling, by a controller of the temperature control apparatus using a wireless communication module of the temperature control apparatus, the remote server for the instruction to change the setpoint temperature. The polling occurs at a first rate of six times per hour or more during a first time period during a day and at a second rate that is lower than the first rate during a second time period of the day. The method further includes controlling, by the controller of the temperature control apparatus, operation of the at least one temperature modifying device in response to a comparison of a measured ambient temperature with the changed setpoint temperature.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Certain terminology is used in the following description for convenience only and is not limiting. The words "a" and "an", as used in the claims and in the corresponding portions of the specification, mean "at least one."

Figure 1:
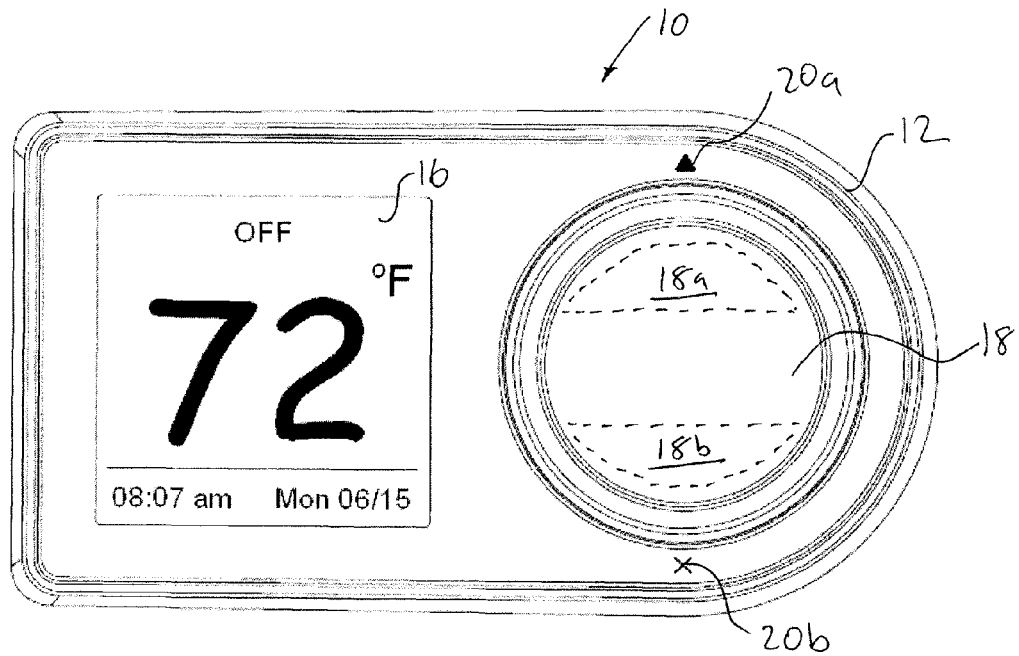
FIG. 1 is front side elevational view of a temperature control apparatus oriented horizontally in accordance with an embodiment of the present invention.
Figure 4:
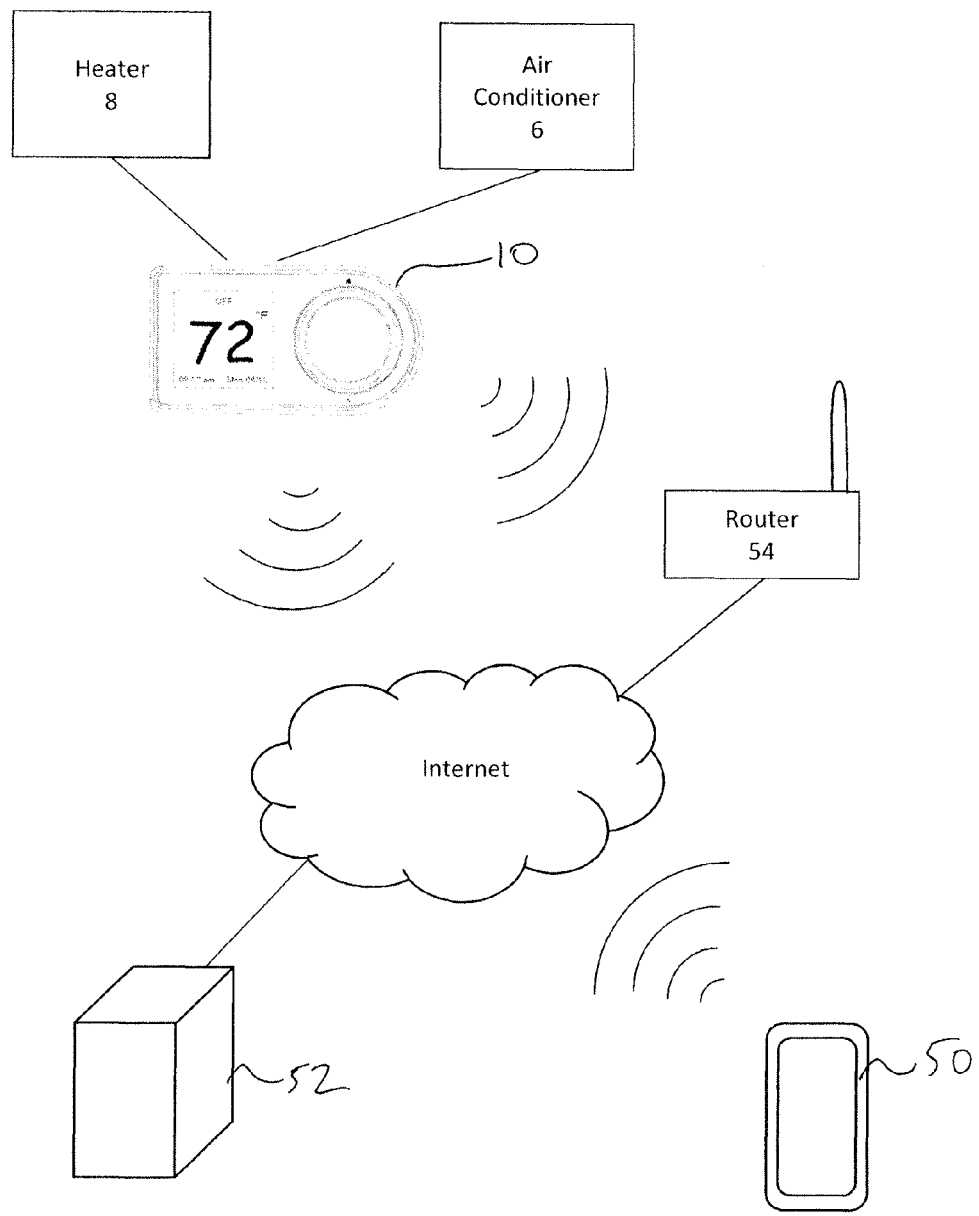
FIG. 4 is a schematic diagram of a communication network including the temperature control apparatus of FIG. 1.

Referring to the drawings in detail there is shown in FIG. 1 a first embodiment of a temperature control apparatus 10, preferably a thermostat, for controlling operation of at least one temperature-modifying device, such as an air conditioning unit 6, a heating unit 8, or the like (FIG. 4). The temperature control apparatus 10 includes a housing 12 that is preferably formed by a front portion and a rear portion, such as shown in U.S. patent application Ser. No. 14/857, 040, the entire contents of which are incorporated by reference herein. The front and rear portions of the housing 12 are preferably coupled to one another via snap-fit or a like coupling so as to be separable to allow access to internal components described hereinafter. The housing 12 may also include other external or internal portions (not shown) that may be integrally formed with or fixedly or removably attached to at least one of the front or rear portions. The front and rear portions of the housing 12 are preferably made from a plastic material, although other types of materials may be used, as is generally known.

The housing 12 is preferably mountable to a support surface (not shown), such as a wall or the like. For example, the housing 12 may include, as part of the rear portion, at least one, and preferably two mounting slots (not shown) for coupling the housing 12 to the support surface. In one embodiment, a screw or a like fastener (not shown) can be inserted through each mounting slot and into the support surface to secure the rear portion of the housing 12 to the support surface. The front portion may then be re-connected to the rear portion to complete the mounting. Of course, other methods for mounting the housing 12 to the support surface can be utilized as well without departing from the spirit of the invention.

Figure 2:
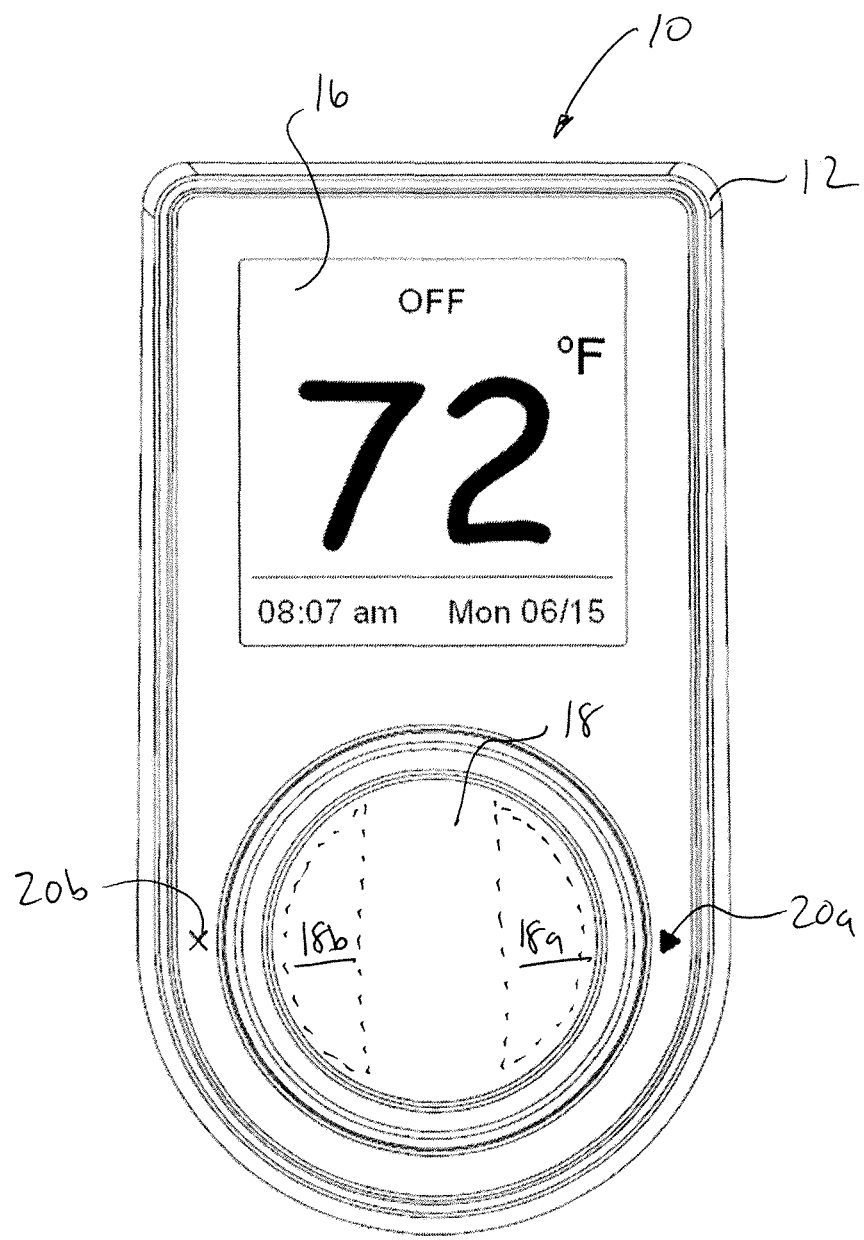
FIG. 2 is a front side elevational view of the temperature control apparatus of FIG. 1 oriented vertically.

During mounting, the housing 12 may be selectively orientable in one of a plurality of configurations. That is, rather than being required to mount the housing 12 in a particular orientation on the support surface, the user may select one of a plurality of configurations. In a preferred embodiment, the housing 12 can be mounted in a horizontal configuration (as shown in FIG. 1) or a vertical configuration (as shown in FIG. 2).

The temperature control apparatus 10 may also include a display 16 that is disposed within or on the housing 12. The display 16 is preferably a liquid crystal display, although other types of electronic displays may be viable, and is used to provide information to the user, such as current temperature, time, date, operational status of the temperature-modifying device, and the like, and also provides operational menus as described further below for controlling operation of the temperature control apparatus 10.

The temperature control apparatus 10 further includes an interface located on the housing 12 to receive input from the user to change one or more settings, such as a setpoint temperature or the like. In FIG. 1, the interface is shown as a rotary dial 18 that is disposed on or at least partially within the housing 12 and is rotatable with respect to the housing 12. The rotary dial 18 can be used to navigate menus on the display 16 or undertake other functions for controlling operation of the temperature control apparatus 10.

The rotary dial 18 also may include at least one portion which is axially movable with respect to the housing 12. For example, in one embodiment, the rotary dial 18 includes two depressible switch portions 18a, 18b that can be actuated by the user to make selections in the menus on the display 16 or perform other functions. In other embodiments, the rotary dial 18 may include fewer or more depressible portions. In still further embodiments, the rotary dial 18 is not movable axially and additional push buttons or switches (not shown) may be provided for certain operations.

In the embodiment shown in FIG. 1, the housing 12 includes a button label 20a, 20b proximate each of the depressible switch portions 18a, 18b as a visual indicator to the user of the functionality of each depressible switch portion 18a, 18b. However, other indicators in other locations may be used as well.

Figure 3:
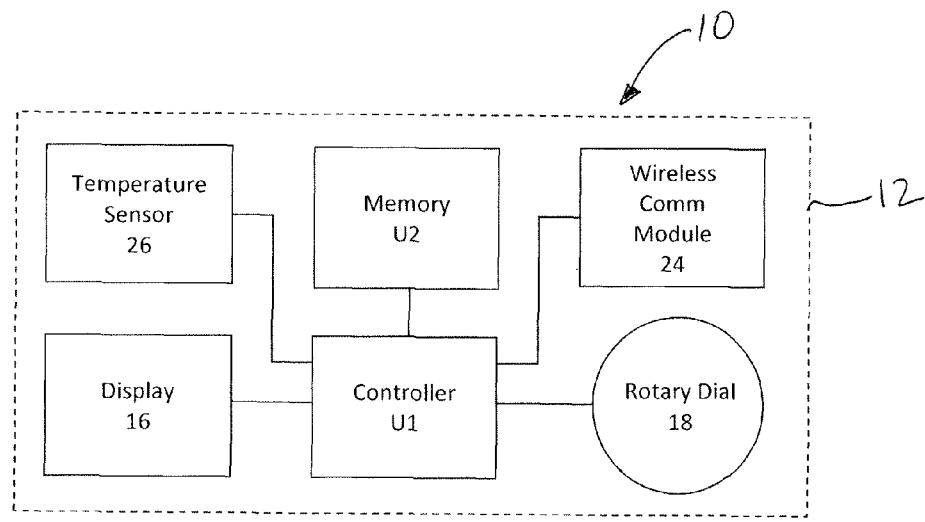
FIG. 3 is schematic diagram of the temperature control apparatus of FIG. 1.

Referring to FIG. 3, the temperature control apparatus 10 also includes a controller U1 contained within the housing 12 and that is operatively connected to the display 16, the rotary dial 18, and any additional inputs or interfaces provided on or in the housing 12. The controller U1 can be a microprocessor, application specific integrated circuit (ASIC), a logic circuit, combinations thereof, or the like. The controller U1 and any other applicable components located within the housing 12 may be powered by conventional methods, such as household wiring to a mains power supply (not shown), batteries 30, or the like, or combinations thereof. The controller U1 is also connected to the temperature modifying device(s) for controlling operation thereof. The connection may be made directly or indirectly using wires (not shown), for which an opening (not shown) is provided in the rear portion of the housing 12. The wiring for such devices is conventionally known. The temperature control apparatus 10 also includes a wireless communication module 24, which may operate using WI-FI, BLUETOOTH, ZIGBEE, Z-WAVE, 3G or 4G cellular or other like types of wireless protocols, which is preferably primarily used for remote operation of the temperature control apparatus 10 by the user, as described in further detail below. However, the wireless communication module 24 may be used for other purposes as well, such as communicating with the temperature modifying device(s) 6, 8.

The controller U1 further includes or is connected to a memory U2, such as RAM, SRAM, DRAM, ROM, EPROM, EEPROM, flash memory, or the like for storing programming functions, user selections and settings, and other data.

The temperature control apparatus 10 preferably also includes one or more temperature sensors 26, in communication with the controller U1, for detecting an ambient temperature of the medium to be controlled. It is preferred that the temperature sensor 26 is disposed within the housing 12, as shown in FIG. 3, although the temperature control apparatus 10 can be utilized with temperature sensors 26 located exterior of the housing 12 as well. Thus, the medium in which the temperature is to be measured can be air, water, or other liquids/gasses. The temperature sensor 26 may include, for example, a thermistor, thermocouple, memory metal (e.g., a nickel-titanium alloy), a bimetallic metal strip, or other type of temperature transducer.

As is conventional, the controller U1 receives from the temperature sensor 26 the measured ambient temperature, which the controller U1 then compares to a setpoint temperature, which is preferably user-selected. In response to the comparison, the controller U1 controls operation of the appropriate temperature modifying device. For example, depending on a comparison of the measured ambient temperature and a first setpoint temperature, the controller U1 may determine to turn a heater 8 (FIG. 4) on or off. Similarly, depending on a comparison of the measured ambient temperature and a second setpoint temperature, the controller U1 may determine to turn an air conditioning unit 6 (FIG. 4) on or off.

The user is preferably able to select the setpoint temperature using the rotary dial 18 or other user interface on the temperature control apparatus 10. For example, the controller U1 may provide a menu on the display 16 that allows the user to select a heating or cooling mode, and to select a setpoint temperature for operation of the appropriate temperature modifying device. In addition, it is contemplated that heating and cooling schedules can be established in the temperature control apparatus 10 by selecting different setpoint temperatures corresponding to different parts of the day. The user may also select the setpoint temperature to hold constant until further changes are made, rather than establishing a schedule. Additionally, when a heating or cooling mode is operational, the user may simply rotate the rotary dial 18 to set an override setpoint temperature that bypasses a programmed schedule for a user-selectable amount of time.

In preferred embodiments of the present invention, a user is able to change the setpoint temperature remotely, such as by a cellular phone, tablet, or other personal computing devices located remotely from the temperature control apparatus 10. FIG. 4 shows a preferred embodiment of the present invention enabling wireless communication between the temperature control apparatus 10 and a user computing device 50, such as a cellular phone. The wireless communication is preferably enabled via a remote Internet-based server 52. Thus, communication between the user computing device 50 and the temperature control apparatus 10 can be implemented using one or a combination of wireless protocols (e.g., a 4G protocol used by the user computing device 50 and a WI-FI protocol used by the temperature control apparatus 10). If necessary, the temperature control apparatus 10 can access the Internet via a wireless router 54, although the router may be internal to the temperature control apparatus 10 and/or omitted entirely.

It is preferred that the temperature control apparatus 10 include at least one mode for handling the wireless communication settings to conserve battery life, particularly during periods of the day when it is less likely that the temperature control apparatus 10 will receive a remote instruction to alter the setpoint temperature or to change some other operational setting in the temperature control apparatus 10. One way to reduce battery consumption is to modify the rate at which the controller U1 uses the wireless communication module 24 to poll the remote server 52 during different times of the day for instructions to change the setpoint temperature. When the temperature control apparatus 10 is connected to a mains power supply, for example, the polling rate could be extremely frequent, such as one-hundred and twenty (120) times an hour (i.e., once every thirty (30) seconds) consistently all day. While this rate could also be used while the temperature control apparatus 10 operates on battery power, the battery life would be severely compromised.

It has been found that polling the remote server 52 at a rate of between about six (6) to ten (10) times an hour is generally sufficiently acceptable to the user in regular operation. Since a heater 8 or air conditioner 6 typically must take time to change the ambient temperature anyway, the delays associated with a reduced polling rate in the above-described range are generally imperceptible to the user. Such a polling rate could be consistently maintained during the day, whether the temperature control apparatus 10 is running on a battery, mains power, or some other power supply. While the above-described polling rate range is preferred, other higher or lower polling rates can also be used.

To further reduce battery consumption, embodiments of the present invention introduce one or more user-selectable modes of operation that divide the day into two or more time periods where the controller U1 polls the remote server 52 at differing rates, based on expected periods of human activity or inactivity. In particular, a user-selectable first mode of operation may be established wherein during a first time period during a day, the controller U1 polls the remote server 52 for a setpoint change instruction, or potentially other pertinent instructions (e.g., changes to settings, date and time, schedules, heating/cooling modes, timers), at a rate of at least six times per hour, and during a second time period during the day, polls the remote server 52 at a lower rate. For example, Table 1 illustrates the hourly polling rates for the controller U1 in an exemplary "High Performance" mode.

TABLE 1

| Start Time | End Time | Duration (mins) | Frequency (poll/hr.) | Start Time | End Time | Duration (mins) | Frequency (poll/hr.) |
|---|---|---|---|---|---|---|---|
| 12 AM | 1 AM | 20 | 3 | 12 PM | 1 PM | 6 | 10 |
| 1 AM | 2 AM | 20 | 3 | 1 PM | 2 PM | 6 | 10 |
| 2 AM | 3 AM | 20 | 3 | 2 PM | 3 PM | 6 | 10 |
| 3 AM | 4 AM | 20 | 3 | 3 PM | 4 PM | 6 | 10 |
| 4 AM | 5 AM | 20 | 3 | 4 PM | 5 PM | 6 | 10 |
| 5 AM | 6 AM | 20 | 3 | 5 PM | 6 PM | 6 | 10 |
| 6 AM | 7 AM | 6 | 10 | 6 PM | 7 PM | 6 | 10 |
| 7 AM | 8 AM | 6 | 10 | 7 PM | 8 PM | 6 | 10 |
| 8 AM | 9 AM | 6 | 10 | 8 PM | 9 PM | 6 | 10 |
| 9 AM | 10 AM | 6 | 10 | 9 PM | 10 PM | 6 | 10 |
| 10 AM | 11 AM | 6 | 10 | 10 PM | 11 PM | 6 | 10 |
| 11 AM | 12 PM | 6 | 10 | 11 PM | 12 AM | 6 | 10 |

As seen in Table 1, the first time period is from about 6 AM to about 12 AM, during which the polling rate is ten times per hour, or once every six minutes. The second time period is from about 12 AM to about 6 AM, which is generally when most people are asleep, and is an unlikely time period in which a request to change the setpoint temperature or some other instruction would be received. Thus, the polling rate is reduced during this second time period to about three times per hour, or once every twenty minutes. In this mode, the remote server is polled 198 times in one day, or an average of once every 7.3 minutes, which significantly reduces the burden on the battery power source.

Table 2 illustrates the hourly polling rates for the controller U1 in a similar, exemplary "Balance" mode of operation.

TABLE 2

| Start Time | End Time | Duration (mins) | Frequency (poll/hr.) | Start Time | End Time | Duration (mins) | Frequency (poll/hr.) |
|---|---|---|---|---|---|---|---|
| 12 AM | 1 AM | 60 | 1 | 12 PM | 1 PM | 10 | 6 |
| 1 AM | 2 AM | 60 | 1 | 1 PM | 2 PM | 10 | 6 |
| 2 AM | 3 AM | 60 | 1 | 2 PM | 3 PM | 10 | 6 |
| 3 AM | 4 AM | 60 | 1 | 3 PM | 4 PM | 10 | 6 |
| 4 AM | 5 AM | 60 | 1 | 4 PM | 5 PM | 10 | 6 |
| 5 AM | 6 AM | 60 | 1 | 5 PM | 6 PM | 10 | 6 |
| 6 AM | 7 AM | 10 | 6 | 6 PM | 7 PM | 10 | 6 |
| 7 AM | 8 AM | 10 | 6 | 7 PM | 8 PM | 10 | 6 |
| 8 AM | 9 AM | 10 | 6 | 8 PM | 9 PM | 10 | 6 |
| 9 AM | 10 AM | 10 | 6 | 9 PM | 10 PM | 10 | 6 |
| 10 AM | 11 AM | 10 | 6 | 10 PM | 11 PM | 10 | 6 |
| 11 AM | 12 PM | 10 | 6 | 11 PM | 12 AM | 10 | 6 |

The "Balance" mode uses similar first and second time periods as the "High Performance" mode, but the polling rate during the first time period (e.g., about 6 AM to about 12 AM) is six times per hour, or once every ten minutes, while the polling rate during the second time period (e.g., about 12 AM to about 6 AM) is only once per hour. This further reduces the number of polls made per day to 114, at an average of once every 12.6 minutes.

Table 3 illustrates yet another embodiment referred to as an "Optimized" mode, which introduces a third time period during which the polling rate is between that of the first and second time periods.

TABLE 3

| Start Time | End Time | Duration (mins) | Frequency (poll/hr.) | Start Time | End Time | Duration (mins) | Frequency (poll/hr.) |
|---|---|---|---|---|---|---|---|
| 12 AM | 1 AM | 60 | 1 | 12 PM | 1 PM | 20 | 3 |
| 1 AM | 2 AM | 60 | 1 | 1 PM | 2 PM | 20 | 3 |
| 2 AM | 3 AM | 60 | 1 | 2 PM | 3 PM | 20 | 3 |
| 3 AM | 4 AM | 60 | 1 | 3 PM | 4 PM | 20 | 3 |
| 4 AM | 5 AM | 60 | 1 | 4 PM | 5 PM | 20 | 3 |
| 5 AM | 6 AM | 60 | 1 | 5 PM | 6 PM | 10 | 6 |
| 6 AM | 7 AM | 10 | 6 | 6 PM | 7 PM | 10 | 6 |
| 7 AM | 8 AM | 10 | 6 | 7 PM | 8 PM | 10 | 6 |
| 8 AM | 9 AM | 10 | 6 | 8 PM | 9 PM | 10 | 6 |
| 9 AM | 10 AM | 20 | 3 | 9 PM | 10 PM | 10 | 6 |
| 10 AM | 11 AM | 20 | 3 | 10 PM | 11 PM | 10 | 6 |
| 11 AM | 12 PM | 20 | 3 | 11 PM | 12 AM | 10 | 6 |

In the "Optimized" mode, the first period is between about 6 AM and about 9 AM and continues again from about 5 PM to about 12 AM, the second period is between about 12 AM and 6 AM, and the third period is between about 9 AM and about 5 PM. The third time period generally corresponds to hours of the day where people are typically at work or in school, and setpoint temperature changes would be unlikely. However, since the users are more likely to be awake, the polling rate, while lower than during the first time period, is still higher than during the second time period. The "Optimized" mode results in only 90 polls per day, for an average of one every 16 minutes.

The temperature control apparatus 10 can be supplied with one or more of these user-selectable operating modes, or similar configurations with alterations in the time periods, polling rates, and the like. Continuous fixed rate operating modes (such as the one described above polling every thirty seconds) can also be included as selectable options, although it is preferred that options with extreme power only be selectable when the temperature control apparatus 10 is connected to a mains power supply. It is also possible to allow the user to alter the time periods to conform with the user's specific schedule.

In order to further conserve power, it is also preferable that the controller U1 shuts off power to the wireless communication module 24 in between polls, particularly when the duration between polls is extended. However, in other embodiments, the wireless communication module 24 may remain at least partially on between polls for performing other communication tasks.

The instruction received from the remote server 52 can also vary according to different embodiments of the present invention. For example, in one embodiment, the user requests a specified change in the setpoint temperature using the user computing device 50, which is transmitted to the remote server 52. The remote server 52 thereafter provides a specific designation of the new setpoint temperature to which the temperature control apparatus 10 is to be set.

Figure 5:
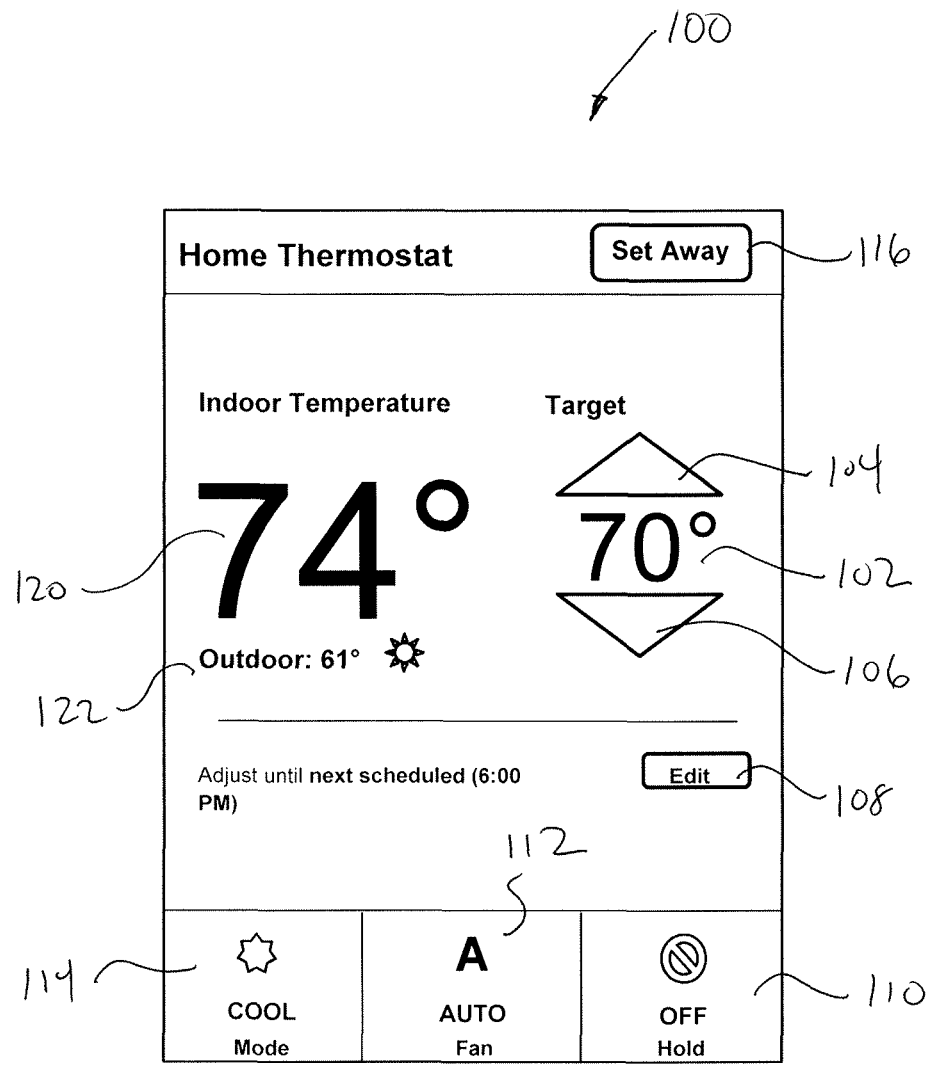
FIG. 5 is a first screenshot of an exemplary application for remotely controlling operation of the temperature control apparatus of FIG. 1.

For example, FIG. 5 shows a screenshot 100 of an embodiment of an application that can be stored and executed on the user computing device 50 for remotely communicating with the temperature control apparatus 10. The application provides a visual indicator 102 of the current setpoint temperature, as well as one or more controls 104, 106 for raising or lowering the setpoint temperature. This information may be included in instructions sent to the remote server 52. Other relevant information may be included in the instruction as well. For example, the application can provide an editing control 108 that allows the user to indicate a time at which the temperature control apparatus 10 is to revert to a previously determined setpoint temperature (such as one in a preset heating/cooling schedule). The application can also provide a "hold" button 110 to indicate to the temperature control apparatus 10 that the setpoint temperature in the visual indicator 102 is to be maintained indefinitely. Other controls, such as a fan control button 112 and a heating mode selection button 114, comparable to the options conventionally found on a temperature control apparatus 10, can also be provided to the user.

Figure 6:
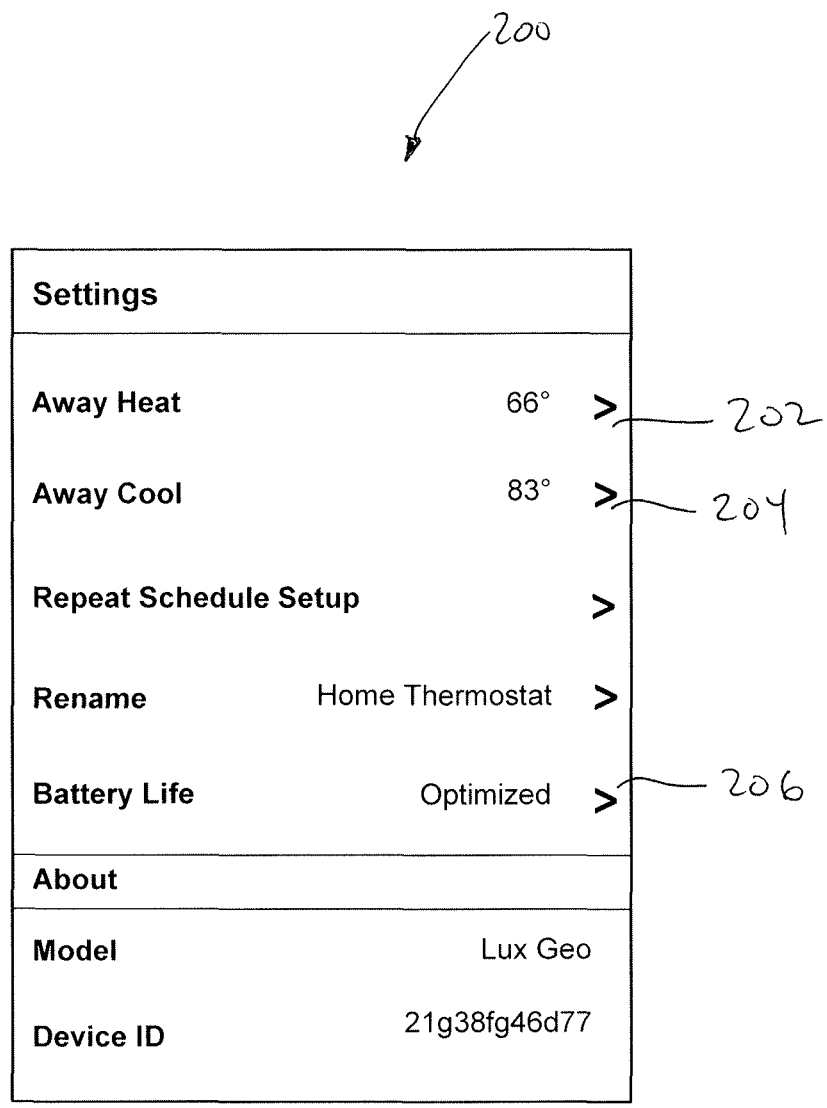
FIG. 6 is a second screenshot of the exemplary application for remotely controlling operation of the temperature control apparatus of FIG. 1.

The application may also provide a "Set Away" button 116, which the user may select to set the temperature control apparatus 10 to a pre-designated "away" temperature. For example, the user may opt to set the temperature control apparatus 10 to a particularly low heat setting (or a high cooling setting) when not at home. FIG. 6 shows a screenshot 200 that allows the user to preselect the "Away Heat" 202 and the "Away Cool" 204 temperatures. The "Set Away" button 116 allows the user to set the temperature control apparatus to the desired "Away" temperature in one step. The instruction received from the remote server 52 can include the designation of the desired away temperature, or may refer to a desired away temperature previously stored in the memory of the temperature control apparatus 10, along with a command to utilize the previously stored value. The user preferably can also revert back to normal operation by selecting the "Set Away" button 116 a second time.

In another embodiment, the temperature control apparatus 10 can take advantage of geolocation to automatically set the "Away" feature and modify the setpoint temperature. For example, a predetermined setpoint temperature (e.g., the "Away Heat" or "Away Cool" temperature 202, 204) may be set corresponding to geolocation of the user outside of a predefined area (e.g., one mile) surrounding the temperature control apparatus 10. That is, when the user is located outside of the predefined area, the temperature control apparatus 10 will automatically change to the predetermined "away" temperature.

Via the geolocation capabilities of the user computing device 50, the position of the user can be determined relative to the temperature control apparatus 10. Upon exiting the predefined area, an instruction may be generated and sent by the remote server 52 to the controller U1 (in response to a poll by the controller U1 for instruction) which will provide an indication for the controller to switch to the predetermined setpoint temperature. Once the user re-enters the predefined area, another instruction may be generated and sent by the remote server 52, providing an indication for the temperature control apparatus 10 to revert back to the original schedule or setpoint temperature.

Also as shown in FIG. 6, the application can provide the user the option to remotely select the polling schedule for the temperature control apparatus 10, via a "Battery Life" option 206 or the like. Communications between the temperature control apparatus 10, the remote server 52, and the user computing device 50 can also include other information, such as the current temperature 120, the outdoor temperature 122, or the like. Other potential operational settings of the temperature control apparatus 10 that may be changed remotely are presented in U.S. patent application Ser. No. 14/857,040.

In another embodiment, the polling rates during the different periods of the day may be adjustable depending on measured conditions, or the like. For example, the controller U1 may periodically measure and store in memory U2 a response time for the wireless communication module 24 to send and/or receive messages. These times can be impacted, for example, by the quality of the router 54 used in the network, a distance between the temperature control apparatus 10 and the router 54, an amount of ambient radio frequency (RF) interference, or the like.

Based on historic information stored in the memory U2, the controller U1 can preferably adjust polling rates in order to achieve a target battery life or power saving profile. The length of time required for the wireless communication module 24 to send and/or receive a message impacts the amount of power consumed by the temperature control apparatus 10. For example, if the send/receive time for messages is relatively short, a higher polling rate frequency may be implemented since the wireless communication module 24 is not over-consuming power during transmissions. Similarly, if the send/receive time is lengthy, a lower polling rate frequency may be implemented to compensate for extra power being consumed during transmission.

Evaluation for polling rate adjustments may vary. For example, when first connected, the temperature control apparatus 10 may initiate a learning period during which the responsiveness of the network is measured and stored, and following this initial period, the polling rates are adjusted and thereafter remain in place. In another embodiment, the user may initiate evaluation periods as desired to improve power consumption. In another embodiment, the controller U1 may institute an evaluation period on its own upon certain power conservation goals not being met, or the detection of another like triggering event. In another embodiment, the controller U1 may regularly initiate evaluation periods and perform adjustments to the polling rates thereafter.

In other embodiments, the controller U1 may continually or periodically measure the response time of the wireless communication module 24, but only adjust polling rates based on the stored data upon receiving a user command or detection of a triggering event, such as a failure to meet power conservation goals or the like. In another embodiment, the controller U1 may continually adjust the polling rates based on the measured response times.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature control apparatus for controlling operation of at least one temperature-modifying device, the apparatus comprising:
   (a) a housing;
   (b) a wireless communication module contained within the housing and configured to communicate with a remote Internet-based server; and
   (c) a controller contained within the housing and in communication with the wireless communication module, the controller being configured to:
   (i) control operation of the at least one temperature modifying device in response to a comparison of a measured ambient temperature with a setpoint temperature,
   (ii) in a user-selectable first mode of operation, during a first pre-scheduled time period during a day, poll the remote server at a first rate of at least six times per hour, using the wireless communication module, for an instruction to change the setpoint temperature,
   (iii) in the first mode of operation, during a second pre-scheduled time period during the day different from the first time period, poll the remote server at a second rate that is lower than the first rate, using the wireless communication module, for an instruction to change the setpoint temperature,
   (iv) in a second user-selectable mode of operation, during the first pre-scheduled time period of the day, poll the remote server at a third rate that is between the first rate and the second rate, using the wireless communication module, for an instruction to change the setpoint temperature, and (v) in the second mode of operation, during the second pre-scheduled time period of the day, poll the remote server at a fourth rate that is lower than the second rate, using the wireless communication module, for an instruction to change the setpoint temperature.

2. The temperature control apparatus of claim 1, wherein the controller is further configured to, in the first mode of operation, during a third pre-scheduled time period during the day different from the first and second time periods, poll the remote server at a fifth rate that is between the first and second rates, using the wireless communication module, for an instruction to change the setpoint temperature.

3. The temperature control apparatus of claim 2, wherein the first pre-scheduled time period is from about 6 AM to about 9 AM and from about 5 PM to about 12 AM, the second pre-scheduled time period is from about 12 AM to about 6 AM, and the third pre-scheduled time period is from about 9 AM to about 5 PM.

4. The temperature control apparatus of claim 1, wherein the controller is further configured to:

(vi) in a third user-selectable mode of operation, during the entire day, poll the remote server at a rate that is higher than the first rate, using the wireless communication module, for an instruction to change the setpoint temperature.

5. The temperature control apparatus of claim 4, wherein the third mode of operation is only selectable if the temperature control apparatus is connected to a mains power supply.

6. A temperature control apparatus for controlling operation of at least one temperature-modifying device, the apparatus comprising:

(a) a housing;
(b) a wireless communication module contained within the housing and configured to communicate with a remote Internet-based server; and
(c) a controller contained within the housing and in communication with the wireless communication module, the controller being configured to:
  (i) control operation of the at least one temperature modifying device in response to a comparison of a measured ambient temperature with a setpoint temperature,
  (ii) in a user-selectable first mode of operation, during a first pre-scheduled time period during a day, poll the remote server at a first rate of at least six times per hour, using the wireless communication module, for an instruction to change the setpoint temperature,
  (iii) in the first mode of operation, during a second pre-scheduled time period during the day different from the first time period, poll the remote server at a second rate that is lower than the first rate, using the wireless communication module, for an instruction to change the setpoint temperature,
wherein the controller is further configured to evaluate a response time for the wireless communication module to send and/or receive messages, and wherein the controller is further configured to adjust at least one of the first or second rates based on the evaluated response time.

7. The temperature control apparatus of claim 1, wherein the instruction to change the setpoint temperature includes a designation of a new setpoint temperature.

8. The temperature control apparatus of claim 1, wherein the instruction to change the setpoint temperature includes an indication for the controller to use a predetermined setpoint temperature corresponding to geolocation of the user outside of a predefined area surrounding the temperature control apparatus.

9. The temperature control apparatus of claim 1, wherein the first pre-scheduled time period is from about 6 AM to about 12 AM and the second pre-scheduled time period is from about 12 AM to about 6 AM.

10. The temperature control apparatus of claim 1, further comprising:

(d) a battery configured to provide power to at least the controller and the wireless communication module.

11. The temperature control apparatus of claim 1, further comprising:

(d) a user interface located on the housing and configured to receive at least input from a user to change the setpoint temperature.

12. The temperature control apparatus of claim 1, wherein the controller is further configured to:

(vi) turn off the wireless communication module in between polls to the remote server.

13. A method for remotely modifying a setpoint temperature in a temperature control apparatus that controls operation of at least one temperature-modifying device, the method comprising:

(a) providing a mobile application configured to be stored and executed on a mobile device by a user of the temperature control apparatus;
(b) receiving, at an Internet-based remote server, an instruction from the mobile application to change the setpoint temperature in the temperature control apparatus;
(c) polling, in a user-selectable first mode of operation by a controller of the temperature control apparatus using a wireless communication module of the temperature control apparatus, the remote server for the instruction to change the setpoint temperature, the polling occurring at a first rate of six times per hour or more during a first pre-scheduled time period during a day and at a second rate that is lower than the first rate during a second pre-scheduled time period of the day;
(d) polling, in a user-selectable second mode of operation by the controller of the temperature control apparatus using the wireless communication module of the temperature control apparatus, the remote server for the instruction to change the setpoint temperature, the polling occurring at a third rate that is between the first rate and the second rate during the first pre-scheduled time period during the day and at a fourth rate that is lower than the second rate during the second pre-scheduled time period of the day; and
(e) controlling, by the controller of the temperature control apparatus, operation of the at least one temperature modifying device in response to a comparison of a measured ambient temperature with the changed setpoint temperature.

14. The method of claim 13, wherein, in the first mode of operation, the polling occurs at a fifth rate that is between the first and second rates during a third pre-scheduled time period during the day different from the first and second pre-scheduled time periods.

15. The method of claim 14, wherein the first pre-scheduled time period is from about 6 AM to about 9 AM and from about 5 PM to about 12 AM, the second pre-scheduled time period is from about 12 AM to about 6 AM, and third pre-scheduled time period is from about 9 AM to about 5 PM.

16. The method of claim 13, wherein the first pre-scheduled time period is from about 6 AM to about 12 AM and the second pre-scheduled time period is from about 12 AM to about 6 AM.

17. The method of claim 13, further comprising:
(e) turning off the wireless communication module, by the controller, between polls to the remote server.

18. The method of claim 13, further comprising:
(e) evaluating a response time for the wireless communication module to send and/or receive messages; and adjusting at least one of the first second, third, or fourth rates based on the evaluated response time.

* * * * *